US009807040B2

(12) United States Patent
Mendiola et al.

(10) Patent No.: US 9,807,040 B2
(45) Date of Patent: Oct. 31, 2017

(54) INSTANT MESSAGING SYSTEM AND METHOD

(71) Applicant: CHIKKA PTE LTD, Singapore (SG)

(72) Inventors: Dennis Mendiola, New York, NY (US); Michael C Garrovillo, Muntinlupa (PH)

(73) Assignee: CHIKKA PTE LTD, Singapore (SG)

(*) Notice: Subject to any disclaimer, the term of this patent is extended or adjusted under 35 U.S.C. 154(b) by 94 days.

(21) Appl. No.: 14/436,864

(22) PCT Filed: Oct. 16, 2013

(86) PCT No.: PCT/SG2013/000443
§ 371 (c)(1),
(2) Date: Apr. 17, 2015

(87) PCT Pub. No.: WO2014/062132
PCT Pub. Date: Apr. 24, 2014

(65) Prior Publication Data
US 2016/0173419 A1    Jun. 16, 2016

(30) Foreign Application Priority Data
Oct. 18, 2012    (SG) .................................. 201207783

(51) Int. Cl.
*H04L 12/58* (2006.01)
*H04L 29/08* (2006.01)
(Continued)

(52) U.S. Cl.
CPC .............. *H04L 51/04* (2013.01); *H04L 51/14* (2013.01); *H04L 69/02* (2013.01); *H04W 4/14* (2013.01)

(58) Field of Classification Search
CPC ................................. H04L 69/02; H04L 51/04
(Continued)

(56) References Cited

U.S. PATENT DOCUMENTS 7,752,268 B2 * 7/2010 Shah ....................... H04L 51/04
709/206
8,504,123 B1 * 8/2013 Choi ................. H04W 52/0229
455/127.5
(Continued)

FOREIGN PATENT DOCUMENTS

CN    102202010 A    9/2011
EP    2 120 407 A1    5/2008
(Continued)

OTHER PUBLICATIONS

"Instant Messaging"—UMASS Lowell, Apr. 2007 http://www.cs.uml.edu/~haim/teaching/iws/513/resources/presentations/01_internet_basics/printer_friendly/04_im.pdf.*
(Continued)

*Primary Examiner* — Randy Scott
(74) *Attorney, Agent, or Firm* — Intellectual Property Law Group LLP

(57) ABSTRACT

An instant messaging system comprising an instant messaging server to which a plurality of client devices are connectable to the Internet; where client device(s) belonging to a user is connectable to the instant messaging server by using an identifier of the user; wherein in a default mode an instant message is sent from a client device to the instant messaging server for routing to an intended recipient via Internet connection; and if the Internet connection is not available the instant message is routed via another electronic link to the instant messaging server for routing to an intended recipient, the another electronic link using a session-based protocol is disclosed.

19 Claims, 2 Drawing Sheets

(51) Int. Cl.
*H04W 4/14* (2009.01)
*H04L 29/06* (2006.01)

(58) Field of Classification Search
USPC .............. 709/203, 204, 205, 206; 455/414.1, 455/426.1, 466
See application file for complete search history.

(56) References Cited

U.S. PATENT DOCUMENTS

| | | | | |
|---|---|---|---|---|
| 2003/0126213 | A1* | 7/2003 | Betzler | ................. H04L 12/581 709/206 |
| 2004/0121785 | A1 | 6/2004 | Vance et al. | |
| 2008/0132259 | A1 | 6/2008 | Vin | |
| 2010/0093382 | A1 | 4/2010 | Samaha | |
| 2011/0202661 | A1 | 8/2011 | Sener | |
| 2013/0023232 | A1* | 1/2013 | Mendiola | ............ H04L 12/1432 455/406 |
| 2013/0166450 | A1* | 6/2013 | Pama | ...................... G06F 21/43 705/44 |

FOREIGN PATENT DOCUMENTS

| | | | |
|---|---|---|---|
| FI | WO 2009138417 A1 * | 11/2009 | ......... H04L 12/5875 |
| JP | 2005078193 A | 3/2005 | |
| WO | WO 2009/138417 A1 | 11/2009 | |
| WO | WO 2010/073199 A1 | 7/2010 | |
| WO | WO 2010/073263 A2 | 7/2010 | |

OTHER PUBLICATIONS

International Search Report, dated Dec. 4, 2013 for corresponding International Application No. PCT/SG2013/000443.
Written Opinion of the ISA, dated Dec. 4, 2013 for corresponding International Application No. PCT/SG2013/000443.
International Preliminary Report on Patentability dated Jan. 27, 2015 for corresponding International Application No. PCT/SG2013/000443.
Japan Notification of Reasons for Refusal dated Jul. 10, 2017 for corresponding Application No. JP 2015-537666 with English translation.

* cited by examiner

INSTANT MESSAGING SYSTEM AND METHOD

FIELD OF INVENTION

The invention relates to an instant messaging system and method.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

With the proliferation of smartphones and the development of faster mobile Internet connection in recent years, over-the-top (OTT) instant messaging services such as Chikka™ Text Messenger are readily available for use by subscribers. However, present OTT messaging platforms require an active Internet connection via Wi-Fi; 3G/4G; GPRS; EDGE; LTE etc. With the exception of free Wi-Fi services which are restricted to specific location(s), Internet connection is typically a paid service and as such OTT messaging is generally restricted to subscribers who could afford post-paid packages where mobile data plans are incorporated. Pre-paid subscribers who are more cost sensitive are charged for Internet connection through a pay-per-specified-time model and may be reluctant to use OTT messaging due to the associated paid Internet access cost involved.

Roaming subscribers away from their home country may be discouraged to use OTT messaging services because international roaming data is charged at a premium, for example at USD 20 per Mega Byte (MB). For a specific group of roaming subscribers, it is important for overseas foreign workers (OFWs) to stay in contact with their loved ones in their home country. However, international SMS/MMS or roaming data is relatively expensive to OFWs.

It is an object of the invention to alleviate the above problems and provide a cost-effective solution to subscribers, in particular to pre-paid subscribers.

SUMMARY OF THE INVENTION

In light of the above, it is desirable to provide an instant messaging system that provides a cost-effective and convenient solution for pre-paid subscribers and roaming subscribers, in particular overseas foreign workers (OFWs).

To render Internet messaging more relevant and more attractive to pre-paid subscribers and foreign workers, instant messages may be routed through the mobile network operator of the subscribers to a particular Unstructured Supplementary Service Data (USSD) service code over the USSD gateway. Such an arrangement utilizes the USSD session capability to allow instant messaging in the absence of an active Internet connection.

In order to utilize the USSD service, a subscriber often has to navigate and key in complex sequences of USSD service codes, the message recipient's identifier and compose his text message within a time frame (within 15 to 30 seconds) before a USSD session ends. This poses a challenge to the subscriber. The invention seeks to overcome this complex problem by providing an automated syntax generation function which alleviates the subscriber's need to key in the complex sequence.

Throughout this document, unless otherwise indicated to the contrary, the terms "comprising", "consisting of", and the like, are to be construed as non-exhaustive, or in other words, as meaning "including, but not limited to".

According to an aspect of the present invention, there is an instant messaging system comprising an instant messaging server to which a plurality of client devices are connectable to the Internet; where client device(s) belonging to a user is connectable to the instant messaging server by using an identifier of the user;
wherein in a default mode an instant message is sent from a client device to the instant messaging server for routing to an intended recipient via Internet connection; and if the Internet connection is not available the instant message is routed via another electronic link to the instant messaging server for routing to an intended recipient, the another electronic link using a session-based protocol.

Preferably, the session-based protocol is a USSD protocol. More preferably, when the client device is installed with a software application thereon, the software application arranged to initiate a USSD session automatically. Ideally, the software application initiates a USSD session automatically based on generating a field comprising an access code for accessing the USSD server and the intended recipient identifier.

Preferably, where the Internet connection and the session-based protocol are not available, the software application is operable to convert the instant message to a regular text message.

Preferably, a reply to the instant message is sent as a text message. More preferably, the reply to the instant message is billed at a premium rate, a fixed cost per message, or a bundled cost for a fixed number of messages.

Preferably, the Internet messaging server charges a flat daily fee for use of the USSD service.

According to another aspect of the invention there is a method for instant messaging between a plurality of client devices selectively connected to an instant messaging server via the Internet and/or other electronic links, where client device(s) belonging to a user is connectable to the instant messaging server by using an identifier of the user, the method comprising the following steps:

a. sending an instant message from a client device to the instant messaging server for routing to an intended recipient via Internet connection in a default mode;

b. detecting if the instant message is sent to the intended recipient and if not, sending the instant message via another electronic link to the instant messaging server for routing to the intended recipient wherein the another electronic link uses a session-based protocol.

Preferably, the session-based protocol is a USSD protocol. More preferably, the instant message is converted to a regular text message where the Internet connection and the session-based protocol are not available.

Preferably, a reply to the instant message is sent as a text message.

Preferably, the reply to the instant message is billed at one of the following:—
a premium rate, a fixed cost per message, or a bundled cost for a fixed number of messages.

According to another aspect of the invention there is a client device having a software application installed thereon, the software application operable to send an instant message from the client device to an instant messaging server for routing to an intended recipient via Internet connection in a default mode; the software application further operable to send the instant message via another electronic link to the instant messaging server for routing to the intended recipient if the Internet connection is not available, the another electronic link using a session-based protocol.

Preferably, the session-based protocol is a USSD protocol. More preferably, the software application is arranged to initiate a USSD session automatically. Ideally, the software application initiates a USSD session automatically based on generating a field comprising an access code for accessing the USSD server and the intended recipient identifier.

BRIEF DESCRIPTION OF THE DRAWINGS

In the figures, which illustrate, by way of example only, embodiment(s) of the present invention, wherein.

Figure 1:
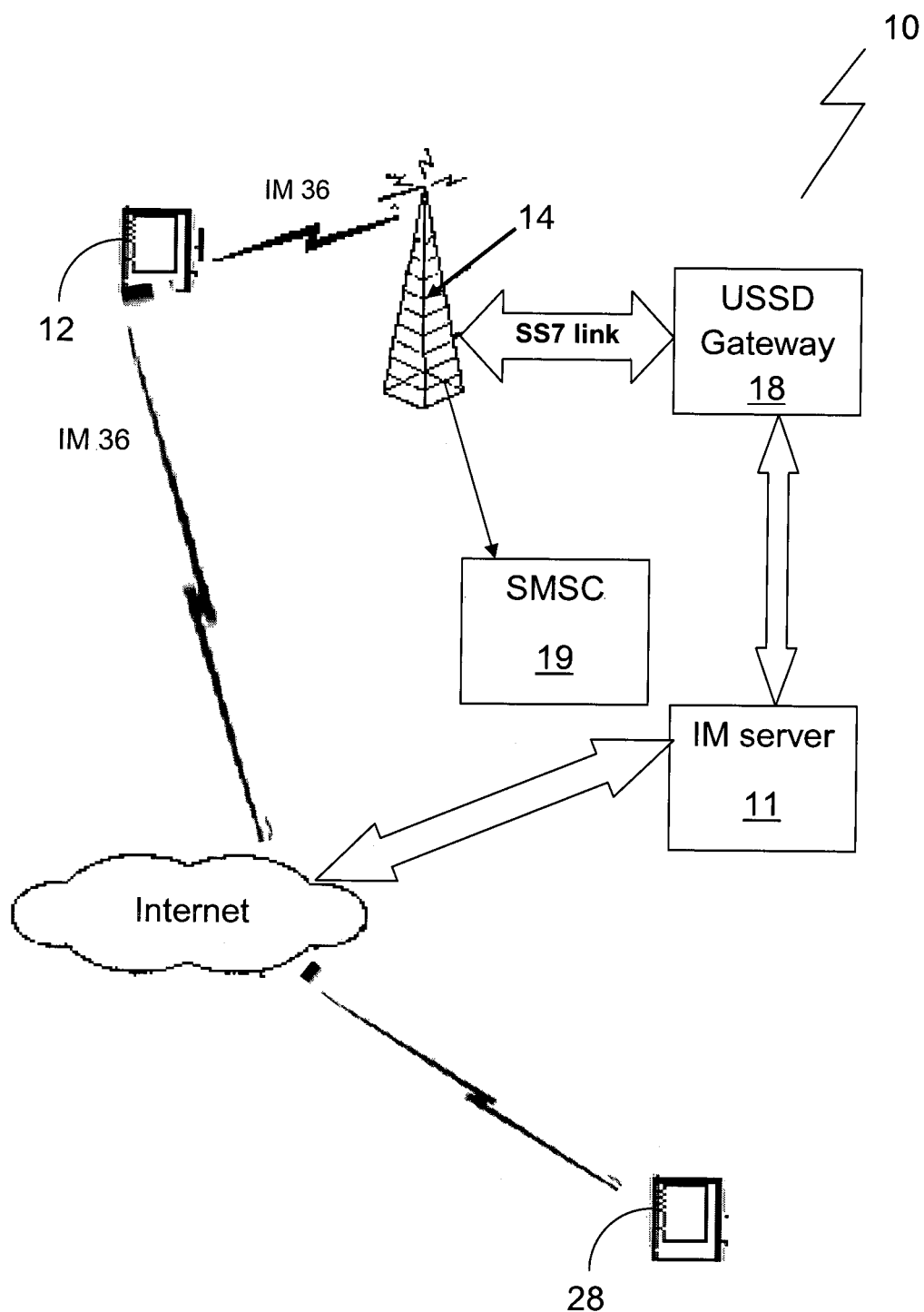
FIG. 1 is a schematic block diagram of the system architecture in accordance with an embodiment of the invention.
Figure 2:
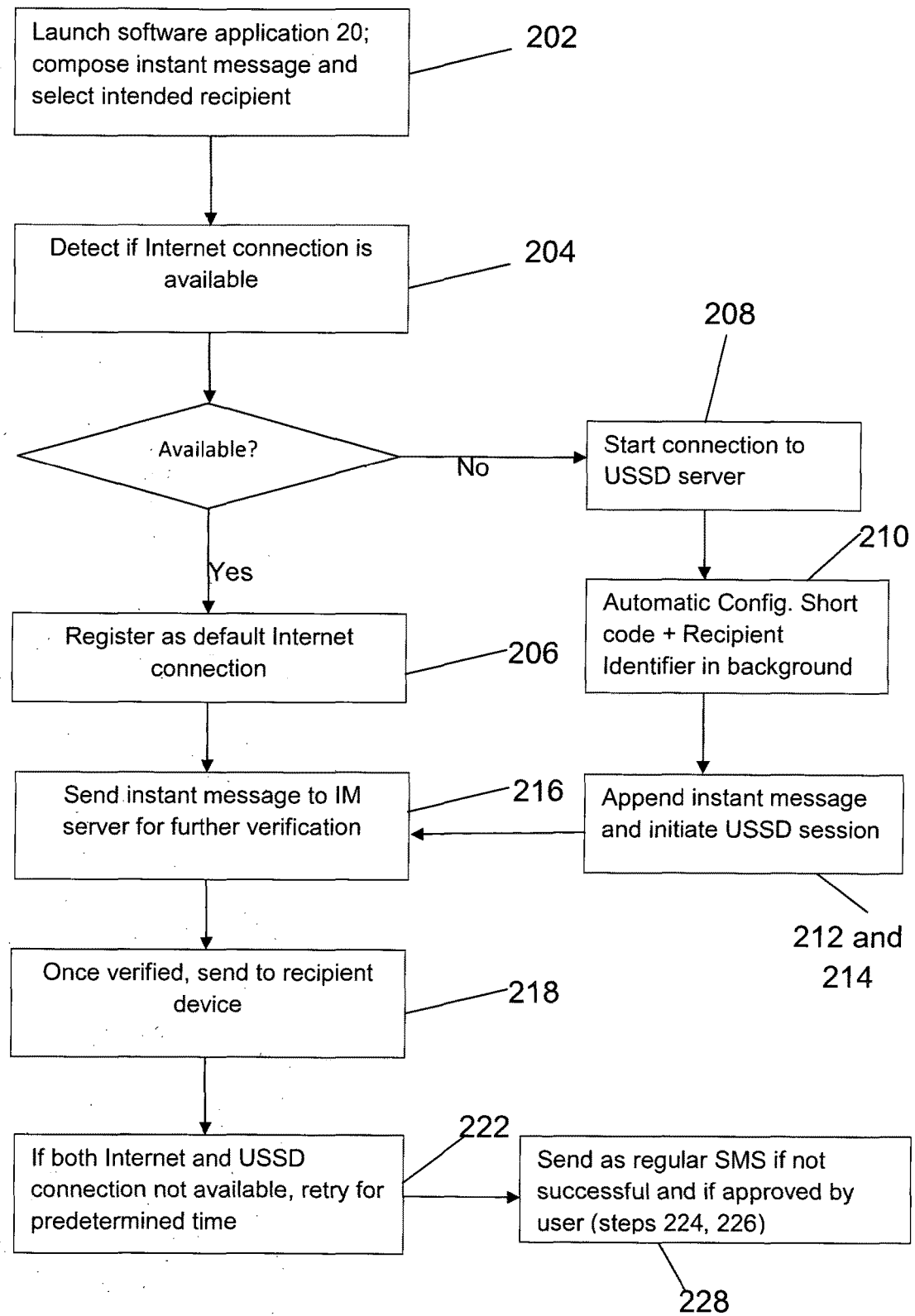
FIG. 2 is a flow chart illustrating the routing algorithm and selection of different types of connection to the Instant messaging server.

Other arrangements of the invention are possible and, consequently, the accompanying drawings are not to be understood as superseding the generality of the preceding description of the invention.

DETAILED DESCRIPTION

In accordance with an embodiment of the present invention there is an instant messaging ("IM") system 10 comprising a IM server 11 to which a number of client devices 12 may be selectively connected via the Internet and/or other electronic links. Different client devices 12 belonging to a user or client, such as PC-terminal, smartphone, or other portable electronic devices capable of sending/receiving text messages may be connected to the IM server 11 by using a suitable identifier, such as a unique identification number ("UIN") for the user, regardless of the appliance or client device 12 used by that user for accessing the IM server 11. Each client has a single account on the IM server 11 for all of its client devices 12 that can access the IM server 11.

By way of example, the other electronic link is via a telecommunications carrier 14 defining an Unstructured Supplementary Services Data (USSD) gateway 18 for connection to the IM server 11. At least one client device 12 is already registered by a subscriber of the telecommunications carrier 14 based on the UIN. Telecommunications carrier 14 also comprises a Short message service center (SMSC) 19 to send and receive SMS messages from various client devices 12.

Client device 12 is preferably a smartphone having a dedicated instant messaging (IM) software application 20 installed thereon. Client device 12 is capable of being connected to the Internet via a variety of means including Wi-Fi; 3G/4G; GPRS; EDGE; LTE etc.

IM software application 20 is operable to be in data communication with the USSD gateway 16, and comprises a routing algorithm 22 to determine whether an instant message should be sent via the Internet and/or other electronic link. IM software application 20 preferably comprises a user interface 24 for a user to view his IM 'buddies' and may include functions to match, alert, and notify contacts in the client device 12 address book who are not already in the buddy list.

IM software application 20 is further able to access the smartphone address book of the client device 12 to obtain an identifier of at least one target recipient 26 of the message. The identifier may typically be the MSISDN of the at least one recipient 26.

The invention will next be described in the context of a user having an account with the IM server 11. The user uses his client device 12 to send an instant message 36 to recipient device 28.

The user launches the software application 20, composes his instant message 36 as well as selects the intended recipient 28 of the instant message 36 (step 202).

The software application 20 next detects if any Internet connection via Wi-Fi; 3G/4G; GPRS; EDGE; LTE etc. is available (step 204). Software application 20 may alternatively list all available Internet connections for selection by the user if more than one Internet connection(s) are available. Once an Internet connection is selected by the user, this Internet connection is registered as the 'default' connection to the IM server 11 (step 206) for subsequent IM sessions.

Upon successful connection to the IM server 11 via selected Internet connection, the IM server 11 receives the sender 14 identifier, the target recipient 28 identifier as well as the instant message 36. IM server 11 does a check and the validity of the receiver identifier 28 (step 216) and upon verification, sends the message to the target recipient 28 (step 218).

In the event no Internet connection is detected, connection to the IM server 11 is established via the USSD gateway 18 (step 208) as follows:

a. In the background, software application 20 automatically configures or generates a preamble, such as a field necessary to initiate a USSD session and send a USSD request. The actual syntax and commands involves keying in a code as follows:—

\*<access code> <target recipient 28 MIN or mobile telephone number if recipient 28 is a mobile or smartphone> (step 210); the access code comprises at least the short code of the IM server 11;

b. The composed message is appended to the short code and target recipient 28 MIN (step 212);

c. The USSD session is initiated via a SS7 link and the connection to the IM server 11 is established (step 214);

d. The IM server 11 receives the sender 14 identifier, the target recipient 28 identifier as well as the message. IM server 11 does a check on the validity of the receiver identifier 28 (step 216) and upon verification, sends the message to the target recipient 28 (step 218).

The benefit of the USSD is especially apparent for a pre-paid subscriber of the telecommunications carrier 14. For a pre-paid subscriber, the IM server 11 may determine if the subscriber is in good standing or charge a flat daily fee for this USSD service that is significantly cheaper than the use-per-specified-time model for Internet connection.

A specific syntax or command relating to the preamble generated in step 210 is as follows:—

\*123\*12345678987# where 123 is USSD shortcode and 12345678987 denotes the sub-menu, BNUM MSISDN, etc.

In the event no Internet connection is detected and the USSD session could not be established (e.g. when no signal is present or the USSD/SS7 links are down), the IM software application 20 will store the IM message 36 and will retry the active Internet connection or the USSD connection, depending on user settings or permissions (step 222). If the message could not be sent within a reasonable time frame (for example 5 minutes), the client device 14 will be prompted that the IM message 36 was unsuccessfully sent (step 224). The user of the client device 14 will be next prompted if he wishes to send the IM message 36 as a regular SMS or MMS (step 226). The cost of sending the message may also be displayed for the user to make a decision. This is especially important for a roaming subscriber as he may not wish to send the SMS or MMS to the recipient device 28 due to the relatively high cost of sending international SMS or MMS. Alternatively, the unsent message will be stored on the client device 14 and resent once a USSD session is established again.

If the user decides to convert the IM message 36 to a regular SMS, the converted message will be sent via the SMSC 19 (step 228).

The invention is provides an easy and convenient means of connecting to the IM server 11 with obvious cost advantage for roaming subscribers and pre-paid subscribers where Internet connection is not available or not preferred.

Through the use of the software application 20 and the background routing algorithm, connections to the IM server 11 could be made based on predetermined preference of the user of client devices 12. The automatic transparent configuration of the USSD commands (where Internet connection is unavailable) provides an easy and convenient way by which a subscriber could activate a connection to the IM server 11 via a USSD session. As USSD is a session-based protocol, the background configuration of syntax also has the added benefit of cutting down dramatically the USSD session time needed to complete a "transaction". It is estimated that an instant messaging session can be successfully concluded in 3-4 seconds versus the present system of using up close to the limit of an allowed session (15-30 seconds).

The user of recipient device 28 may choose to send a return instant message via the USSD server 18 or via other means. In the event where user of recipient device 28 chooses to send the return instant message as a text message via a more reliable and efficient channel, the text message in the format of:—

Short Code+UIN (where the UIN is a MIN or a Mobile Phone Number) followed by the text message;

the user of recipient device 28 may be charged a premium rate for doing so. The premium rate may vary depending on peak or non-peak periods. The premium rate may also be based on a fixed cost for a fixed number of messages; or based on a fixed cost per message.

Although the foregoing invention has been described in some detail by way of illustration and example, and with regard to one or more embodiments, for the purposes of clarity of understanding, it is readily apparent to those of ordinary skill in the art in light of the teachings of this invention that certain changes, variations and modifications may be made thereto without departing from the spirit or scope of the invention as described in the appended claims. In particular:—

The USSD gateway 18 may alternatively be replaced by other session-based protocol gateway.

In addition to UINs, MSISDN, email addresses, credit card or bank account numbers etc may be used as identifiers in isolation or in combination with one another. Additional password(s) may be required for added security.

The invention claimed is:

1. An instant messaging system comprising
an instant messaging server arranged to be connectable to at least one client device belonging to a user via Internet connection by using an identifier of the user;
the client device installed with a software application thereon; and
the software application operable to send an instant message is to the instant messaging server for routing to an intended recipient via Internet connection in a default mode,
wherein if the Internet connection is not available, the software application is operable to automatically generate a field comprising an access code and an identifier of the intended recipient to initiate a session, and send the instant message via the session using a session-based protocol to the instant messaging server for routing to the intended recipient.

2. The system according to claim 1, wherein the session-based protocol is a USSD protocol.

3. The system according to claim 2, the software application arranged to initiate a USSD session automatically.

4. The system according to claim 3, wherein the software application initiates the USSD session automatically based on generating the field comprising the access code for accessing a USSD server and the identifier of the intended recipient.

5. The system according to claim 4, wherein the instant message is appended to the access code and the identifier of the intended recipient.

6. The system according to claim 1, wherein where the Internet connection and the session are not available, the software application is operable to convert the instant message to a regular text message.

7. The system according to claim 1, wherein a reply to the instant message is sent as a text message.

8. The system according to claim 7, wherein the reply to the instant message is billed at a premium rate, a fixed cost per message, or a bundled cost for a fixed number of messages.

9. The system according to claim 1, wherein the instant messaging server charges a flat daily fee for use of a USSD service.

10. A method for providing instant messaging service for at least one client device, wherein the at least one client device belonging to a user is connectable to an instant messaging server by using an identifier of the user, the method comprising the following steps:
sending an instant message from the at least one client device to the instant messaging server for routing to an intended recipient via Internet connection in a default mode;
if the Internet connection is not available, generating a field comprising an access code and an identifier of the intended recipient to initiate a session; and
sending the instant message via the session using a session-based protocol to the instant messaging server for routing to the intended recipient.

11. The method for instant messaging according to claim 10, wherein the session-based protocol is a USSD protocol.

12. The method for instant messaging according to claim 10, wherein the instant message is converted to a regular text message where the Internet connection and the session are not available.

13. The method for instant messaging according to claim 10, wherein a reply to the instant message is sent as a text message.

14. The method for instant messaging according to claim 13, wherein the reply to the instant message is billed at one of the following:
a premium rate, a fixed cost per message, or a bundled cost for a fixed number of messages.

15. A client device having a software application installed thereon, the software application operable to send an instant message from the client device to an instant messaging server for routing to an intended recipient via Internet connection in a default mode, wherein if the Internet connection is not available, the software application is further operable to automatically generate a field comprising an access code and an identifier of the intended recipient to initiate a session, and send the instant message via the session using a session-based protocol to the instant messaging server for routing to the intended recipient.

16. The client device according to claim 15, wherein the session-based protocol is a USSD protocol.

17. The client device according to claim 16, wherein the software application is arranged to initiate a USSD session automatically.

18. The client device according to claim 17, wherein the software application initiates the USSD session automatically based on generating the field comprising the access code for accessing a USSD server and the identifier of the intended recipient.

19. The client device according to claim 18, wherein the instant message is appended to the access code and the identifier of the intended recipient.

\* \* \* \* \*